United States Patent [19]

Parks et al.

[11] Patent Number: 4,842,723
[45] Date of Patent: Jun. 27, 1989

[54] WATER PURIFYING APPARATUS

[75] Inventors: Elmer L. Parks, New Cumberland; Fred A. Pennington, Mechanicsburg, both of Pa.

[73] Assignee: Bowman, Mell Company, Inc., Harrisburgh, Pa.

[21] Appl. No.: 134,099

[22] Filed: Dec. 17, 1987

[51] Int. Cl.$^4$ .............................................. C02F 1/78
[52] U.S. Cl. ..................................... 210/95; 210/192; 210/202; 210/251
[58] Field of Search .................. 210/748, 192, 94, 95, 210/200–203, 205, 206, 243, 251

[56] References Cited

U.S. PATENT DOCUMENTS

| | | | |
|---|---|---|---|
| 4,141,830 | 2/1979 | Last | 210/748 |
| 4,179,616 | 12/1979 | Coviello et al. | 210/748 X |
| 4,274,970 | 6/1981 | Beitzel | 210/748 |
| 4,595,498 | 6/1986 | Cohen et al. | 210/192 |

Primary Examiner—Tom Wyse
Attorney, Agent, or Firm—Thomas Hooker

[57] ABSTRACT

A water purifying apparatus includes a water line extending from a source to a nozzle and having a filter, a sanitizing element and a venturi in the line. An ozone generator is connected to the venturi to supply ozonated air to the water flowing through the line. The ozone sanitizes the nozzle as water is discharged into a bottle.

12 Claims, 2 Drawing Sheets

WATER PURIFYING APPARATUS

The invention relates to a water purifying apparatus, more particularly a coin-operated water vending machine which receives water from a source, purifies the water and discharges the water together with ozone through a nozzle and into a bottle supplied by the customer. The discharge nozzle is exposed to permit the customer to place the bottle receiving the water under the nozzle and may become contaminated. The ozone entrained with the dispensed water sanitizes the nozzle to assure that the water is not contaminated while flowing through the nozzle and into the bottle.

Population growth, dense land use, environmental concerns and, in some cases, poor quality public water increase demand for potable drinking water. This demand is met by purchasing bottled water, commonly spring or distilled water. Bottled water is relatively expensive, in part because of the cost of bottles for containing the water and inventory, shipping, shelf and sales costs.

Another approach to supplying potable water is to dispense the water from a vending machine directly into a bottle supplied by the customer. In this case, the customer places the bottle in the machine in position to receive water from a discharge nozzle and then inserts sufficient coins into the machine to actuate the machine. When actuated, the machine cycles and discharges a volume of potable water sufficient to fill the bottle. Bottle, inventory, shipping shelf and sales costs are reduced.

Prior water dispensing machines do not contain a provision to sanitize the discharge nozzle through which water is flowed into the supplied bottle. This nozzle is exposed and can easily be contaminated by bacteria, particularly since the nozzle is wetted each time a bottle is filled.

The present water purifying apparatus receives raw water from a source, conventionally a public water line, and purifies it by removing particulate matter, commonly dirt or silt and organic materials if present. The water then passes through an ultra-violet treatment to kill bacteria remaining in the water. If desired, the water may be passed through a deionizing tank to remove any dissolved minerals. Ozone is entrained within the treated water flowing to the nozzle and into the customer's bottle. The entrained ozone sanitizes the nozzle to assure that the water delivered in the bottle is pure and bacteria-free. In the unlikely event the ultra-violet treatment unit fails, the ozone has the added advantage of killing bacteria.

Other objects and features of the invention will become apparent as the description proceeds, especially when taken in conjunction with the accompanying drawings illustrating the invention, of which there are two sheets and one embodiment.

IN THE DRAWINGS

Figure 1:
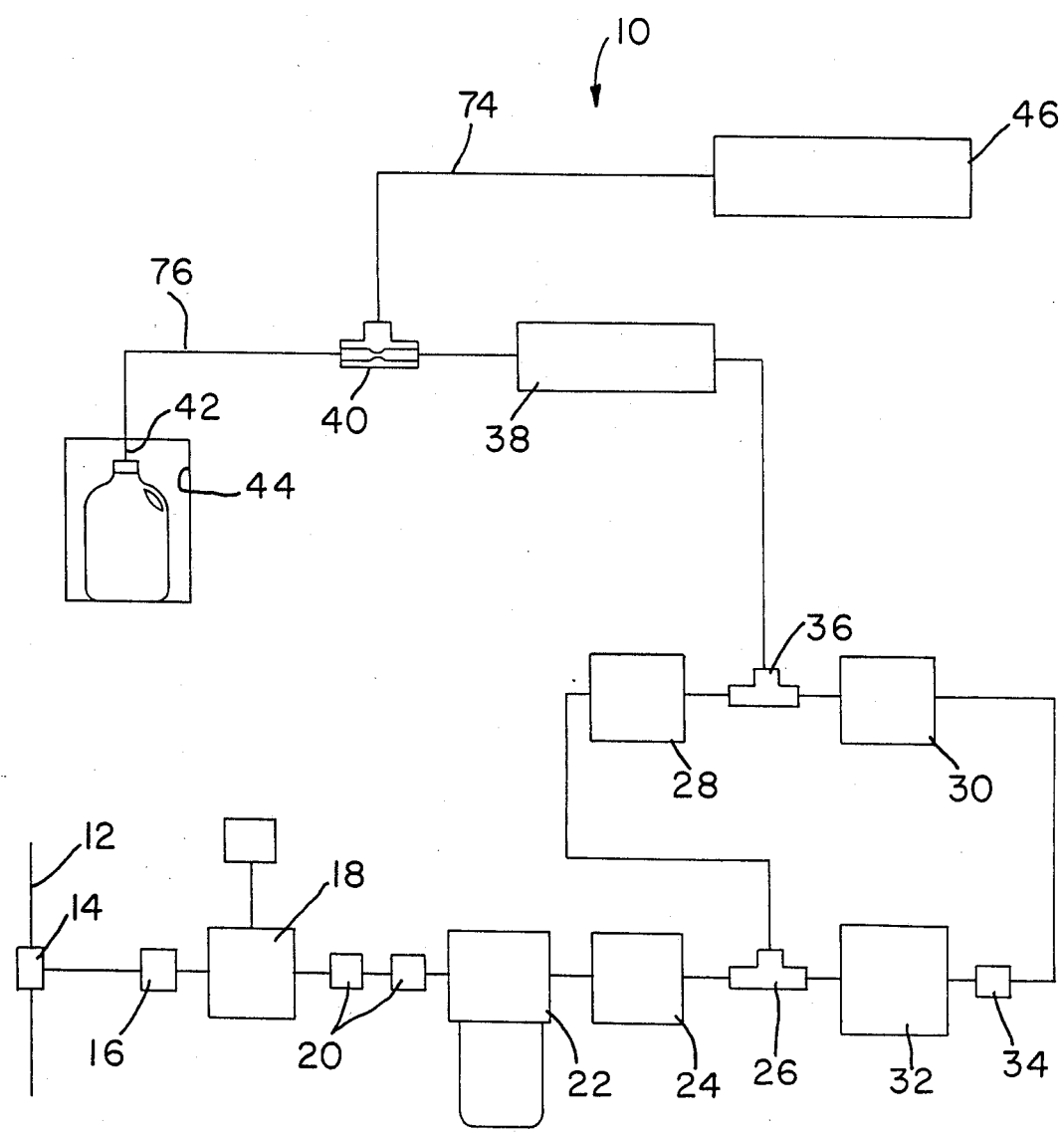
FIG. 1 is a schematic drawing illustrating the apparatus of the invention.

As shown in FIG. 1, water purifying apparatus 10 receives impure water from source 12 at fitting 14. The water flows from the fitting through a line of series-mounted elements including volume meter 16, pressure control valve 18, redundant back check valves 20, dirt filter 22, carbon block filter 24 and T-fitting 26. The water flows through one of two alternate line branches joining fittings 26 and 36. One branch includes a solenoid controlled shut-off valve 28 and the other branch includes series oriented mixed bed resin exchange deionizing tank 32, resistivity sensor 34 and solenoid controlled valve 30. The lamp in unit 38 is on during the time apparatus 10 is available for use.

The water flows from fitting 36 through ultraviolet lamp and filter unit 38, venturi 40 and is discharged into the customer's bottle through nozzle 42 located above a bottle in filling compartment 44. Ozone generator 46 is connected to the reduced pressure inlet of venturi 40 so that water flowing through the venturi draws ozone from the generator into the venturi. The ozone is entrained with the water flow as bubbles and is discharged through the nozzle.

Figure 2:
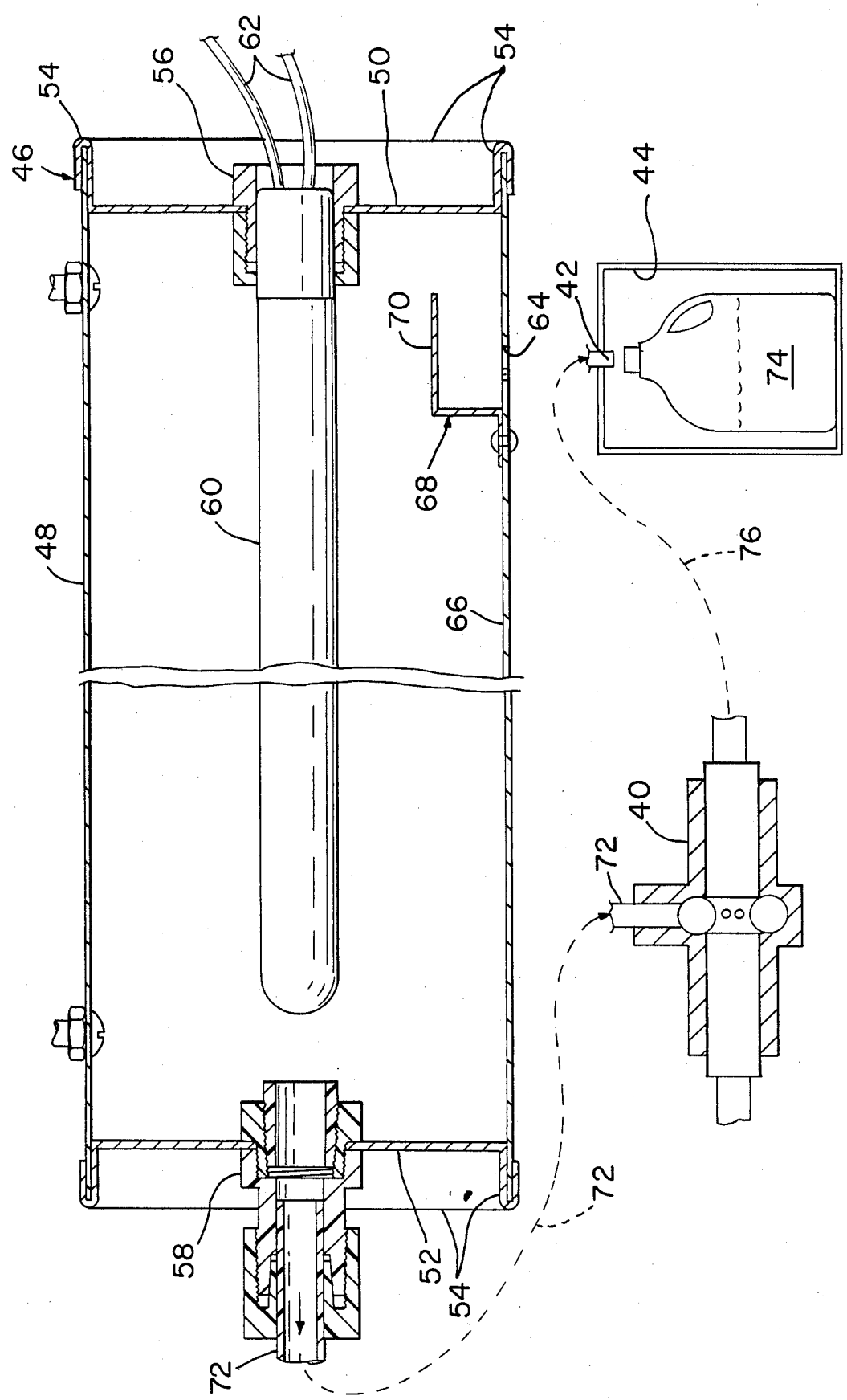
FIG. 2 is a longitudinal sectional view taken through the ozone generator of FIGS. 1.

The ozone generator 46 as shown in FIG. 2 includes an elongate square metal body 48 formed from thin sheet metal with a pair of square end caps 50 and 52 closing the ends of the body. Mounting bolts 54 suitably secure generator 46 to apparatus 10. The end caps 50 and 52 fit snugly within the ends of body 48 and each include four U-fold sides 54 fitted over and clasping the sides of body 48 to hold the end caps in place. Bulb socket 56 is mounted in the center of cap 50 and outlet fitting 58 is mounted in the center of cap 52. An elongate ozone generating ultra-violet bulb 60 is fitted in socket 56. Bulb leads 62 are connected to circuitry of apparatus 10 (not illustrated) to actuate the bulb as required during operation of the apparatus. The bulb 60 extends centrally along the length of generator body 48. An air inlet opening 64 is formed through body sidewall 66 adjacent cap 50 to admit air into the interior of the generator. Eye shield 68 is secured to the interior of sidewall 66 at the opening and includes a plate 70 located a distance above the opening. During servicing of apparatus 10 visual inspection is made through opening 64 to determine whether bulb 60 is lighted. The shield prevents direct observation of the bulb and possible eye injury.

One end of a tube 72 is connected to the fitting 58 in cap 52 and the other end of the tube is connected to the low pressure port of venturi 40. During flow of water through apparatus 10 bulb 60 is turned on to generate ozone within the interior of the generator. This ozone is drawn through fitting 58 and tube 72 into the venturi where it is entrained as bubbles in the water and flows out nozzle 42 and into the receiving bottle 74. As ozone is depleted from the generator at cap 52 at one end of the body air is replenished into the generator through opening 64 at the other end of the body. The newly admitted air is slowly drawn down the length of the generator and exposed to ultraviolet radiation generated by bulb 60, thereby converting the oxygen in the air to ozone. The air is fully ozonated by the time it reaches fitting 58 and is drawn into the venturi. The generator assures that full strength ozone is drawn into the venturi and entrained with the water to assure the nozzle 42 is properly sterilized by the ozone The operation of the water purifying apparatus will now be described. Prior to depositing the appropriate money into the machine and initiating a cycle of operation a customer places a bottle of sufficient capacity in compartment 44 with nozzle 42 above the mouth of the bottle. Typically, the bottle may have a one gallon capacity. The customer also pushes a button switch to actuate one of valves 28 and 30 to open one of the two lines between fittings 26 and 36. If valve 28 is opened water does not flow through mixing bed 32. If valve 30 is opened water flows through the bed and is demineralized.

When the appropriate coins are deposited in the apparatus 10 the ultra-violet bulb 60 in generator 46 is turned on, resistivity meter 34 is actuated and volume meter 16 is activated for a complete cycle permitting the requisite volume of water to flow through the apparatus in order to fill bottle 74.

Water flows from fitting 14 through the meter, pressure control valve 18 and redundant back check valves 20 and through filter 22. Valves 20 assure there is no back discharge into the water source 12. Filter 22 contains a replaceable filter cartridge for removing solids. Typically, the filter has a one micron porosity. The water is then flowed through carbon block filter 24 which may have a porosity of 0.5 micron. The two filters effectively remove solids from the water.

In the event valve 30 is open water flows through the ion exchange filter bed tank 32 and is demineralized. The operation of the ion exchange bed 32 is monitored by sensor 34 which measures the resistivity of the water discharged from the ion exchange tank. Distilled water has a resistivity of about 1 megohm. During proper operation tank 32 removes sufficient chemical impurities from the water to raise the resistance of the water to about 1 megohm. The sensor shuts down apparatus 10 if the resistivity of the water discharged from the tank 32 falls to below this level. If valve 28 is open water flows directly between fittings 26 and 36.

Water flowing from fitting 36 passes through the ultraviolet lamp and filter 38. The ultra-violet light in the filter kills bacteria in the water. The filter is downstream from the resin bed tank and captures any solids which may leak from the tank. The filter may have a porosity of about 5 microns. From the lamp and filter 38 the water flows through the venturi and entrains ozone from generator 46 as previously described. The line 76 connecting the discharge and of the venturi to the nozzle 42 is preferably transparent or light transmitting to permit visual inspection and determination that ozone is entrained in the discharge water. The ozone is seen as bubbles moving through the line with the water. In this way, maintenance personnel may assure that the ozone generator and venturi are operating properly. If desired, a light transmitting fitting may be provided in an otherwise opaque line 76.

Generator 46 produces sufficient ozone to kill bacteria on the nozzle and, it is believed, to kill bacteria in the compartment 44. Ozone entrained in the water as delivered to the bottle separates out of the water and flows out the bottle neck into the compartment.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

What is claimed as our invention is:

1. Water purifying apparatus including a water line extending between a water source and a water dispensing nozzle; the line including first means for removing solids from the water flowing through the line, second means for killing bacteria in the water flowing through the line, the first and second means being located on the water line away from the nozzle, and a venturi located on the water line adjacent to the nozzle and having a low pressure port; an ozone generator; and an ozone line extending between the ozone generator and the low pressure port of the venturi whereby ozonated air from the generator is drawn into the water flowing through the water line at the venturi and is flowed with the water along the water line and out the nozzle to sanitize the nozzle, the water line including an inspection portion located between the venturi and the nozzle whereby bubbles of ozonated air entrained with the water passing through the water line are visible through such portion.

2. Water purifying apparatus as in claim 1 wherein said portion is a length of light transmitting tubing.

3. Water purifying apparatus as in claim 1 wherein the ozone generator includes an elongate hollow body, third means for generating ozone in the body, an outlet port adjacent one end of the body and an inlet port adjacent the other end of the body and wherein the ozone line is connected to said outlet port whereby ozone is drawn out of one end of the body and into the ozone line, replenishment air flows through the inlet and into the other end of the body and along the interior of the body and is ozonated by the third means.

4. Water purifying apparatus as in claim 3 wherein the body includes end caps closing the ends of the body, said outlet port being located at one end cap and wherein said third means comprises an elongate ultraviolet bulb and including a bulb socket in the other end cap, said bulb being secured in said socket.

5. Water purifying apparatus as in claim 4 wherein said end caps each include U-fold means fitted over the ends of the body to secure the caps in place.

6. Water purifying apparatus as in claim 4 wherein said body is rectangular in cross section, said end caps are rectangular and each include four U-fold sides fitted over the ends of the sides of the body.

7. Water purifying apparatus as in claim 3 wherein said inlet port extends through a wall of said ozone generator and including an eye-shield secured to said wall having a plate spaced from and overlying the inlet opening whereby light generated by said third means is indirectly visible through the inlet opening.

8. Water purifying apparatus as in claim 7 wherein said body includes end caps each including U-fold means fitted over the ends of the body to secure the caps in place.

9. Water purifying apparatus as in claim 8 wherein said body is rectangular in cross section, said end caps are rectangular and each cap includes four U-fold sides fitted over the ends of corresponding side of the body.

10. Water purifying apparatus including a water line extending between a water source and a water dispensing nozzle; the line including first means for removing solids from the water flowing along the line, second means for killing bacteria in the water flowed through the line, and a venturi having a low pressure port; and an ozone generator including a hollow body, third means for generating ozone within the body, an inlet port at one end of the body, an outlet port connected to the ozone line at the other end of the body, and an eye-shield mounted on the interior of the body having a plate spaced from the body and located between the inlet opening and the third means whereby light from said third means is indirectly visible through the inlet opening; and an ozone line extending between the outlet port and the low pressure port of the venturi.

11. Water purifying apparatus as in claim 10 wherein the venturi is located on the water line adjacent the nozzle, the first and second means are located on the water line away from the nozzle, and a portion of the water line between the venturi and the nozzle is light transmitting.

12. Water purifying apparatus as in claim 11 wherein said portion is a length of light transmitting tubing.

* * * * *